United States Patent
Yamaguchi et al.

(10) Patent No.: US 6,947,759 B1
(45) Date of Patent: Sep. 20, 2005

(54) COMMUNICATION TERMINAL AND CHANNEL CONNECTION

(75) Inventors: Kentoku Yamaguchi, Hachioji (JP); Koichi Ito, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 189 days.

(21) Appl. No.: 09/665,687

(22) Filed: Sep. 20, 2000

(30) Foreign Application Priority Data

Sep. 30, 1999 (JP) .................................. 11-280042

(51) Int. Cl.⁷ ............................................. H04Q 7/22
(52) U.S. Cl. ...................... 455/507; 455/461; 455/500; 455/509; 455/553.1
(58) Field of Search ................................ 455/434, 450, 455/455, 464, 522, 507, 420, 416–417, 414.1, 455/502, 500, 509, 553.1, 552.1, 127.4, 515, 455/461

(56) References Cited

U.S. PATENT DOCUMENTS

| | | | |
|---|---|---|---|
| 4,989,230 A | | 1/1991 | Gillig et al. .................. 379/59 |
| 5,297,190 A | * | 3/1994 | Ito .............................. 455/455 |
| 5,594,944 A | * | 1/1997 | Ogata ......................... 455/34.1 |
| 5,664,007 A | | 9/1997 | Samadi et al. ............... 455/442 |
| 5,907,794 A | * | 5/1999 | Lehmusto et al. ........... 455/11.1 |
| 5,911,120 A | * | 6/1999 | Jarett .......................... 455/417 |
| 5,913,171 A | * | 6/1999 | Solonen et al. .............. 455/502 |
| 5,943,333 A | * | 8/1999 | Whinnett et al. ............ 370/345 |
| 5,966,667 A | * | 10/1999 | Halloran et al. ............ 455/552.1 |
| 6,112,088 A | * | 8/2000 | Haartsen ..................... 455/437 |
| 6,163,680 A | * | 12/2000 | Bridle et al. ................ 340/825.2 |
| 6,175,620 B1 | * | 1/2001 | Rouge et al. ............... 379/207.01 |
| 6,449,484 B1 | * | 9/2002 | Grubeck ...................... 455/450 |
| 6,507,567 B1 | * | 1/2003 | Willars ........................ 370/321 |
| 6,608,820 B1 | * | 8/2003 | Bradshaw, Jr. .............. 370/260 |
| 6,745,043 B1 | * | 6/2004 | Lester et al. ................ 455/512 |

FOREIGN PATENT DOCUMENTS

| | | |
|---|---|---|
| WO | WO 95/23485 | 8/1995 |
| WO | WO 99/29126 | 6/1999 |
| WO | WO 99/38345 | 7/1999 |

* cited by examiner

*Primary Examiner*—William Trost
*Assistant Examiner*—Brandon J. Miller
(74) *Attorney, Agent, or Firm*—Finnegan, Henderson, Farabow, Garrett & Dunner, L.L.P.

(57) ABSTRACT

The communication terminal comprises a first radio unit for making radio communication with a base station over a first radio channel having a first radio frequency band, and a second radio unit for making radio communication with another communication terminal by using a second radio channel having a second radio frequency band. A first channel establishing section establishes the first radio channel to the base station through the first radio unit. A second channel establishing section establishes the second radio channel to the another communication terminal through the second radio unit. A control section connects the base station to the another communication terminal over the first and second radio channels.

14 Claims, 8 Drawing Sheets

COMMUNICATION TERMINAL AND CHANNEL CONNECTION

CROSS-REFERENCE TO RELATED APPLICATIONS

This application is based upon and claims the benefit of priority from the prior Japanese Patent Application No. 11-280042, filed Sep. 30, 1999, the entire contents of which are incorporated herein by reference.

BACKGROUND OF THE INVENTION

The present invention relates to a mobile communication terminal such as a portable phone, a PHS (Personal Handy Phone), or the like, and a channel connection method therefore.

Conventionally, an analogue or digital portable phone is a kind of terminal that forms a radio channel. Communication is made with a calling party in the opposite, which is connected to a public telephone network, through a base station connected to a radio channel network.

This state is shown in FIG. 8. This figure shows a conventional channel connection form. In this figure, the reference symbol 1 denotes a communication terminal of a communication in the opposite side. The reference symbols 2, 3, 4, and 5 respectively denote a public network, a radio channel network, a base station, and a conventional communication terminal.

In the communication terminal 5, one radio unit is mounted in one casing. A radio channel to the base station 4 is formed by using this radio unit. Therefore, no communication can naturally be made through another radio channel while a radio channel is formed by the radio unit included therein.

As another kind of terminal, a dual-mode terminal includes two radio units in one casing and serves as both of an analogue portable phone and a digital portable phone. In this dual mode terminal, the radio unit for an analog portable phone is included in the one same casing, in order to compensate for the drawback that a digital portable phone is usable within a narrow service area. Outside the service area of the digital portable phone, the dual-mode terminal is switched to an analogue portable phone.

This state is shown in FIG. 9. This figure shows a channel connection form of a conventional dual mode terminal. In the figure, the reference symbol 1 denotes a communication terminal of a calling party in the opposite side. The reference symbol 2 denotes a public network. The reference symbols 3a, 3b, 4a, and 4b respectively denote a radio channel network of an A-system, a radio channel network of a B-system, a base station of the A-system, a base station of the B-system, and a conventional dual mode terminal. Note that the A-system is a communication system for an analogue portable phone and the B-system is a communication system of a digital potable phone.

The dual mode terminal 6 has two radio units in order to compensate for the service area of the digital portable phone, as described above. These two radio units do not operate simultaneously but operate singly with respect to the base stations 4a and 4b connected to the radio channel networks 3a and 3b, respectively, thereby forming a radio channel. Accordingly, if a radio channel is formed with one of the base stations 4a and 4b, another radio channel cannot be formed.

As described above, a conventional communication terminal cannot form a plurality of radio channels within one casing. Therefore, when a response is made to a communication request from a calling party, there is a drawback that the communication channel to this calling party cannot be transferred to another communication terminal. To avoid this drawback, the calling party must shut off the channel which is currently connected to the called communication terminal and must further make an operation of dialing up the telephone number of another communication terminal.

That is, the calling party must shut off the radio channel to the communication terminal (the called side) connected to a base station and must further input the telephone number of another communication terminal to make another call, so complicated operation is required. Also, the calling party must pay an extra communication charge for this second call.

BRIEF SUMMARY OF THE INVENTION

The present invention hence has an object of providing a communication terminal and a channel connection method by which information of a radio channel connected with a base station can be transferred to another communication terminal in an inexpensive manner which does not burden the caller.

To obtain the above object, the first aspect of the present invention proposes a communication terminal having a first radio unit for making radio communication with a base station over a first radio channel having a first radio frequency band, and a second radio unit for making radio communication with another communication terminal by using a second radio channel having a second radio frequency band, the communication terminal comprising:

a first channel establishing section for establishing the first radio channel to the base station through the first radio unit;

a second channel establishing section for establishing the second radio channel to the another communication terminal through the second radio unit; and a control section for connecting the base station to the another communication terminal over the first and second radio channels.

Further, to obtain the above object, the second aspect of the present invention proposes a channel connection method for a communication terminal having a first radio unit for making radio communication with a base station over a first radio channel having a first radio frequency band, and a second radio unit for making radio communication with another communication terminal by using a second radio channel having a second radio frequency band, the method comprising steps of:

establishing the first radio channel to the base station through the first radio unit;

establishing the second radio a channel to the another communication terminal through the second radio unit; and connecting the base station to the another communication terminal over the first and second radio channels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, an embodiment of the present invention will be explained with reference to the drawings.

Figure 1:
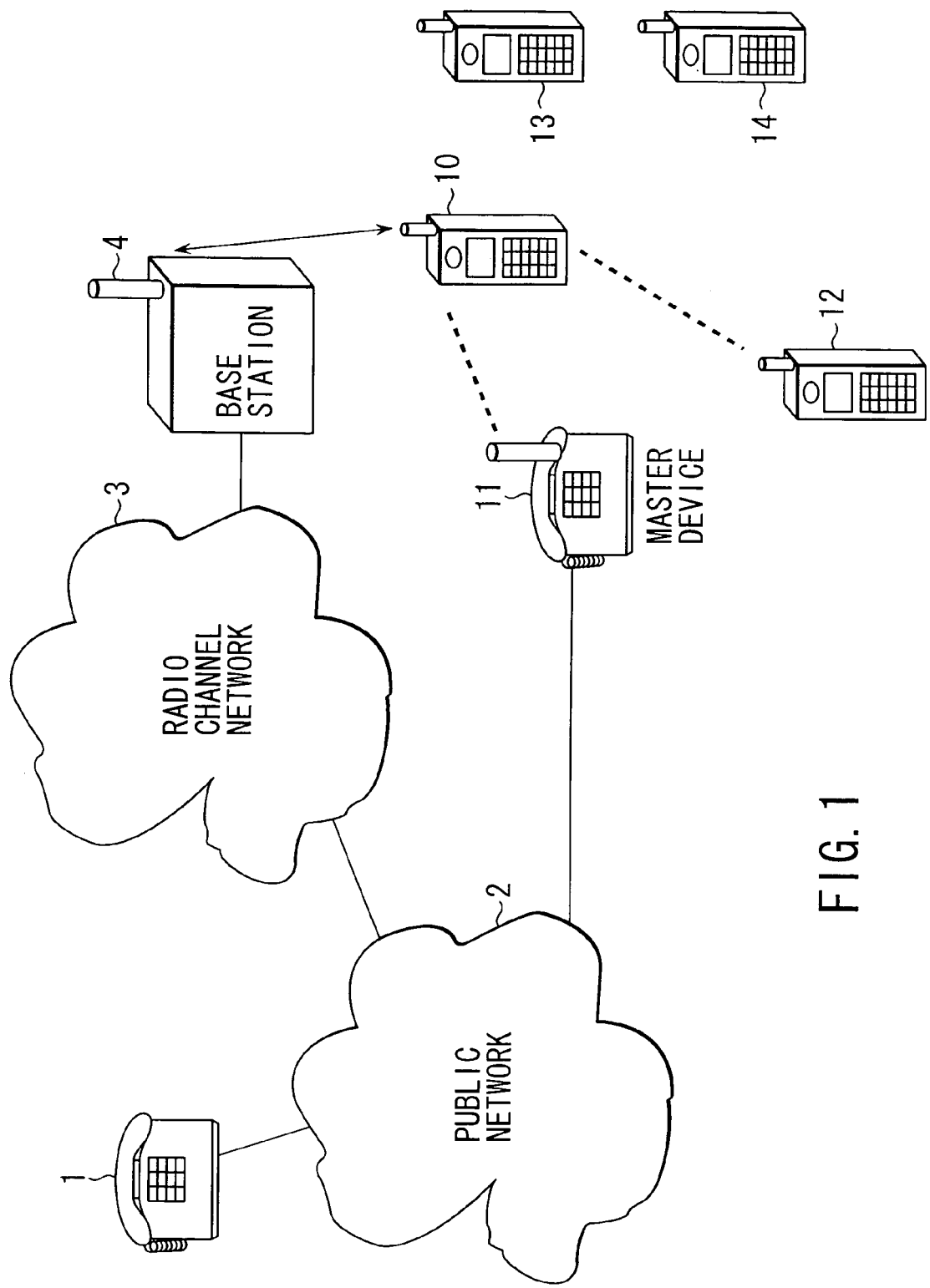
FIG. 1 is a view showing a channel connection form using communication terminals according to the present invention.

FIG. 1 is a view showing a channel connection form using a communication terminal according to the present invention. The reference symbol 1 in the figure denotes a communication terminal in the opposite side. The reference symbols 2, 3, 4, and 10 respectively denote a public network, a radio channel network, a base station, and a communication terminal of the present invention.

The communication terminal 10 is established by, for example, a mobile communication terminal device such as a portable phone, a PHS, or the like. This communication terminal comprises at least a first radio unit and a second radio unit. The first radio unit makes radio communication with the base station 4, using a radio wave of a predetermined radio frequency band. The second radio unit makes communication with one of other communication terminals 12 to 14 or a master device 11 connected to a wired channel, using a radio wave of a radio frequency band different from the above. The communication terminal 10 is capable of simultaneously operating the two radio units.

Figure 2:
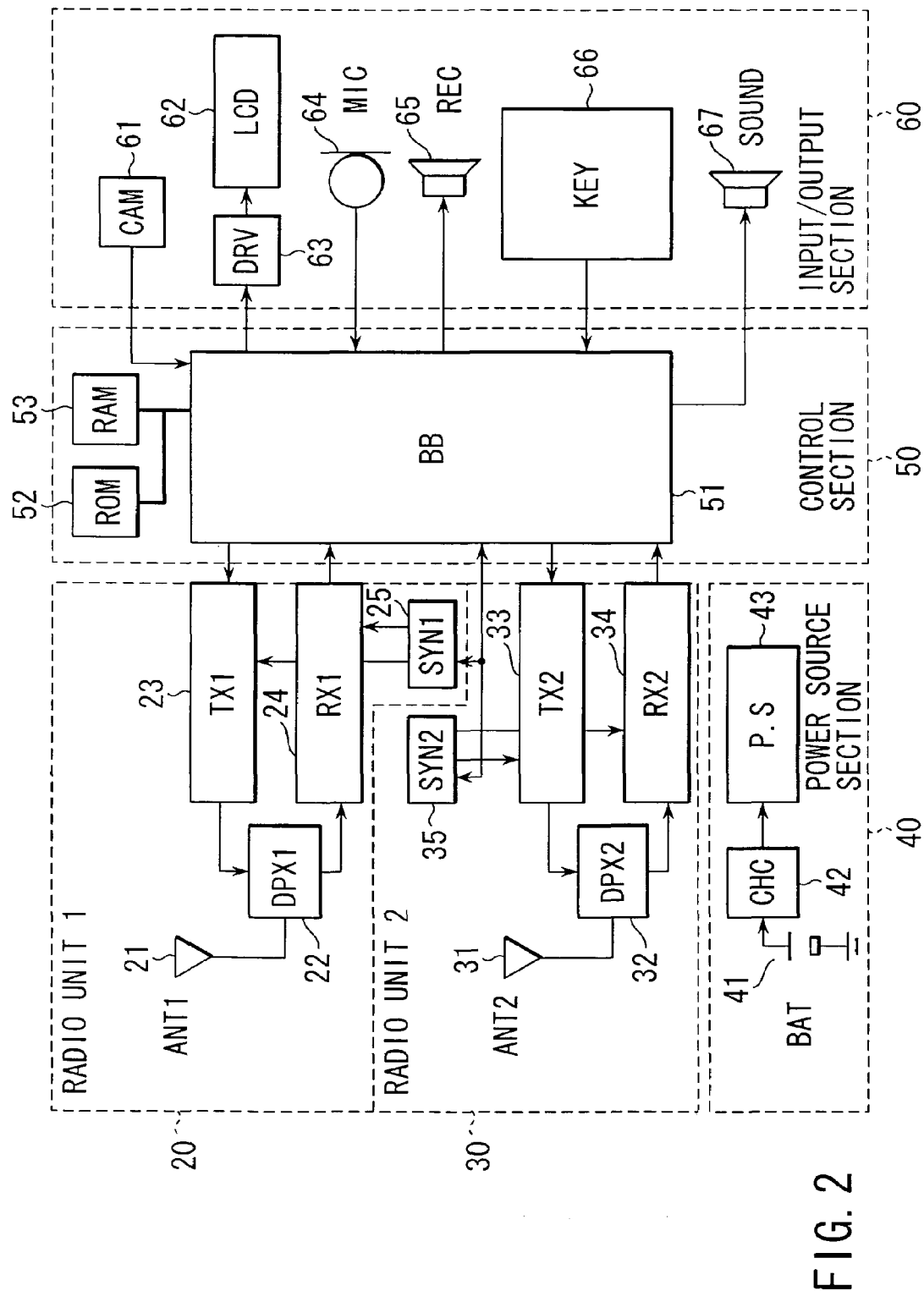
FIG. 2 is a block diagram showing the internal structure of the communication terminal.

FIG. 2 shows the internal structure of the communication terminal 10.

The communication terminal 10 is provided with a first radio unit 20, a second radio unit 30, a power section 40, a control section 50, and an input/output section 60.

The first radio unit 20 is a radio unit for making radio communication with the base station 4 connected to a radio channel, by a radio wave having a first radio frequency band, and is comprised of an antenna 21, a duplexer 22, a transmitter 23, a receiver 24, and a synthesizer 25. The first radio frequency band is 800 MHz, for example, according to the PDC of the TDMA method.

In the first radio unit 20, the antenna 21 serves to transmit/receive a radio wave to/from the base station 4. The duplexer 22 is a device which allows the antenna to be used in common by the transmitter 23 and the receiver 24. The transmitter 23 makes processing for modulating a transmission signal from the control section 50 into a radio wave having the first radio frequency band. The receiver 24 makes processing for demodulating a radio wave having the first radio frequency band into a signal having such a format that can be processed by the control section 50.

The second radio unit 30 is a radio unit for making radio communication with one of other communication terminals 12 to 14 or a master device connected to a wired channel, by a radio wave having the second radio frequency band without the base station 4. Like the first radio unit 20, the second radio unit 30 is comprised of an antenna 31, a duplexer 32, a transmitter 33, a receiver 34, and a synthesizer 35. The second radio frequency band is 2.45 GHz in case of a Bluetooth system, for example.

The Bluetooth system is a radio communication system according to the radio communication standard for short ranges. Radio communication of about 10 m is realized by using 2.45 GHz. In this Bluetooth system, eight terminal devices can be connected at most and form a network called a pico-net in which one of the terminal devices functions as a master device and the other function as slave devices. The terminal devices in the pico-net confirm their connections by a code number called a PIN (Personal Identification Number).

In the second radio unit 30, the antenna 31 serves to transmit/receive a radio wave to/from one of the other communication terminal 12 to 14 or the master device 11 connected to a wired channel. The duplexer 32 functions to allow the antenna to be used in common by the transmitter 33 and the receiver 34. The transmitter 33 performs processing of modulating a transmission signal from the control section 50 into a radio wave of a second radio frequency band. The receiver 34 performs processing of demodulating the radio wave having the second radio frequency band, which is received through the antenna 31, into a signal of a format which can be processed by the control section 50.

The power source section 40 serves to supply a power necessary to operate each section of the communication terminal 10, and is comprised of a battery 41, a charge circuit 42, and a power source circuit 43. The transmission power of the second radio unit 30 is designed to be much smaller than the transmission power of the first radio unit 20. The power supply of the power source section 40 to the second radio unit 30 is smaller than that of the first radio unit 20.

The control section 50 serves to control the entire terminal and is comprised of a base band signal processing section 51, a ROM 52, and a RAM 53. The base band signal processing section 51 has a microprocessor and performs base band signal processing. The ROM 52 stores a program necessary for operating this terminal. The RAM 53 is used as a work memory for storing temporarily various data.

The input/output section 60 is a section for inputting and outputting data. In this case, the section 60 comprises a camera 61 for inputting a image-pickup data, a LCD (Liquid Crystal Display) 62, a LCD driver 63 for driving the LCD 62, a microphone 64 for inputting sound data, a receiver 65 for outputting sound data, and a sounder 67 for generating a call ring or the like.

(Single Channel Communication)

In this structure, explanation will be firstly made of the calling/receiving operation in single-channel communication using the first radio unit 20.

When the communication terminal 10 is called from a calling party, a call-receipt signal is transmitted from the base station 4 to the communication terminal 10. This call-receipt signal is received through the antenna 21 of the first radio unit 20 and is sent through the duplexer 22 and the receiver 24 to the base band signal processing section 51 of the control section 50 where signal processing is made on the call-receipt signal. In accordance with an instruction from the base station 4, the control section 50 transmits a response signal with respect to the call-receipt signal, through the transmitter 23, the duplexer 22, and the antenna 21 from the base band signal processing section 51.

If a defined response signal can be received from the communication terminal 10, the side of the base station 4 decides a communication channel and transmits a channel-designating signal thereof. The communication terminal 10 receives the channel-designating signal transmitted from the base station 4, through the same route as described above. The control section 50 performs signal processing on the channel designating signal, by the base band signal processing section 51. Thereafter, the control section 5 sends a control signal to the synthesizer 25 to switch to the designated channel.

Switching to the channel is completed, and a communication channel to the base station 4 is established. Then, the side of the communication terminal 10 provides a visible/audible indication (e.g., a call-receipt sound is generated from the sounder 67) to inform the operator of the receipt of a call.

If the operator then inputs a response through the input/output section 60 of the communication terminal 10 by pushing down a conversation button or so, the control section 50 connects the signal of the communication channel to an input/output device appropriate for the communication mode and starts communication. In case of a sound signal, the microphone 64 and the receiver 65 are connected as the input/output device. Otherwise, in case of a TV-phone signal, the camera 61 and the LCD 62 are connected as the input/output device.

Meanwhile, in case of calling a calling party from the communication terminal 10, the operator inputs necessary information such as a communication mode, a specification of a connection target, or the like to the base band signal processing section 51, with use of a user interface such as a keyboard 66 or the like provided for the input/output section 60. Thereafter, the operator inputs a call request by pushing down a transmission button or so. In this manner, a call signal is transmitted through the transmitter 23, the duplexer 22, and the antenna 21 from the base band signal processing section 51.

If the side of the base station 4 can receive the defined call signal, this side decides a communication channel and returns a channel-designating signal thereof to the communication terminal 10.

The communication terminal 10 receives the channel designating signal sent from the base station 4 through the same route as described above and performs signal processing by the base band signal processing section 51. Thereafter, the communication terminal 10 sends a control signal to the synthesizer 25 to switch to the designated channel.

Switching of the channel is completed, and communication is established through the communication channel. A ring-back signal is sent from the side of the radio channel network 3. If the designated connection target responds to its, the communication channel is established between both calling partys. At the same time when the communication channel is established, a signal is connected to the input/output section 60 which has been in a communication mode. For example, in case of sound conversation, the signal is connected to the microphone 64 and the receiver 65 to make a conversation.

Next, the second radio unit 30 will be explained below. The second radio unit 30 is to realize a system in which communication terminals directly connect with each other wirelessly with the base station 4 inserted therebetween. This kind of system includes transceivers using weak radio waves, amateur radio units, and the like, in addition to the Bluetooth system described above. In the example of FIG. 1, a radio unit (second radio unit 30) for realizing the present system is mounted on each of the communication terminal 10, the master device 11 connected to a wired channel, and the other communication terminals 12 to 14. A radio network is established by these devices.

In this system, the communication terminal as a calling party sends its own ID, the ID of a connection target, the telephone number thereof, or the like as a call signal to a control channel. The communication terminal as the connection target is waiting on the control channel. Upon detection of a call signal calling the target, the communication terminal as the connection target replies a response signal and goes to a previously designated communication channel, thereby to form a radio channel with respect to the communication terminal as the calling party.

This will be explained more specifically, supposing that the communication terminal 10 receives a call. A call signal transmitted from the communication terminal as the calling party is received by the antenna 31 of the second radio unit 30 and passes through the duplexer 32 and the receiver 34. The call signal is then subjected to signal processing by the base band signal processing section 51. If the ID of the connection target contained in the call signal corresponds to the ID of the communication terminal 10, a response signal to the call signal is sent from the base band signal processing section 51 through the transmitter 33, the duplexer 32, and the antenna 31.

If the communication terminal as the calling party can receive the defined response signal, this terminal decides a communication channel and returns a channel-designating signal thereof to the connection target. The communication terminal 10 receives the channel designating signal sent from the communication terminal as the caller, in the same route as described above. The control section 50 performs signal processing on the channel designating signal by the base band signal processing section 51. Thereafter, the control section 50 sends a control signal to the synthesizer 35 to switch to the designated channel.

The switching of the channel is completed, and a communication channel to another communication terminal is established. The side of the communication terminal 10 provides a visible/audible indication (e.g., a call-receipt sound is generated from the sounder 67) to inform the operator of the presence of a call.

If the operator then inputs a response through the input/output section 60 of the communication terminal 10 by pushing down the conversation button or the like, the control section 50 connects the signal on the communication channel, to an input/output device suitable for the communication mode.

Meanwhile, in case of calling another communication terminal from the communication terminal 10, the operator inputs necessary information such as a communication mode, a specification of a connection target, or the like to the base band signal processing section 51 of the control section 50, with use of the user interface such as a keyboard 66 or the like provided for the input/output section 60 of the communication terminal 10. Thereafter, the operator pushes down a transmission button or so to transmit a call signal through the transmitter 33, the duplexer 32, and the antenna 31 from the base band signal processing section 51.

If the communication terminal as the connection target receives a defined call signal, this side transmits a response signal. The response signal transmitted from the connection target is received by the antenna 31 of the second radio unit 30 and is subjected to signal processing by the base band signal processing section 51, after passing through duplexer 32 and the receiver 34. If a defined response signal can be received, a communication channel is decided and a channel designating signal thereof is returned through the same route as described above. The communication terminal as the connection target switches the communication channel in accordance with the channel designating signal sent from the communication terminal 10 as the calling party. In this manner, communication is made through a communication channel between both calling partys.

(Plural-Channel Communication)

The above explanation has been made of a case of using singly the first radio unit 20 or the second radio unit 30. Explained now will be a case of using together the first radio unit 20 and the second radio unit 30 to make plural-channel communication.

In the following, it is supposed that the communication terminal 1 shown in FIG. 1 calls the communication terminal 10, the communication terminal 10 forms a radio channel to the base band signal processing section 4 by using the first radio unit 20, and the communication terminal 10 is required to transfer the channel to another communication terminal (e.g., the master device 11 or one of the other communication terminals 12 to 14).

Figure 3:
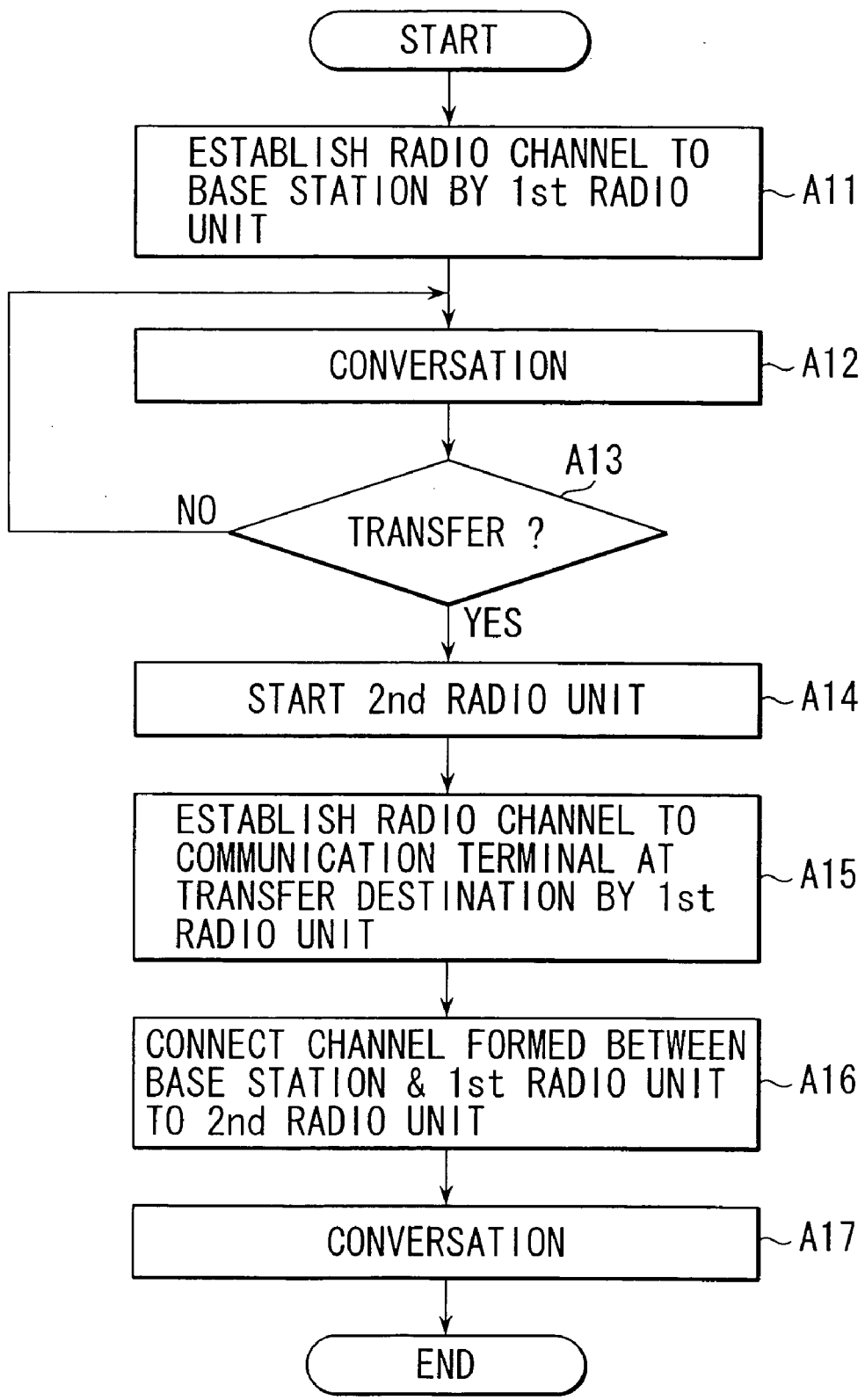
FIG. 3 is a flowchart showing call-receipt operation in plural-channel communication.

FIG. 3 is a flowchart showing the operation receiving a call in the plural-channel communication.

When a communication request is issued to the communication terminal 10 according to the present invention from the communication terminal 1, a radio channel to the base station 4 is formed by the first radio unit 20 mounted on the communication terminal 10 (step A11) in the method described above, so conversation or the like can be made with the calling party (step A12).

Figure 4:
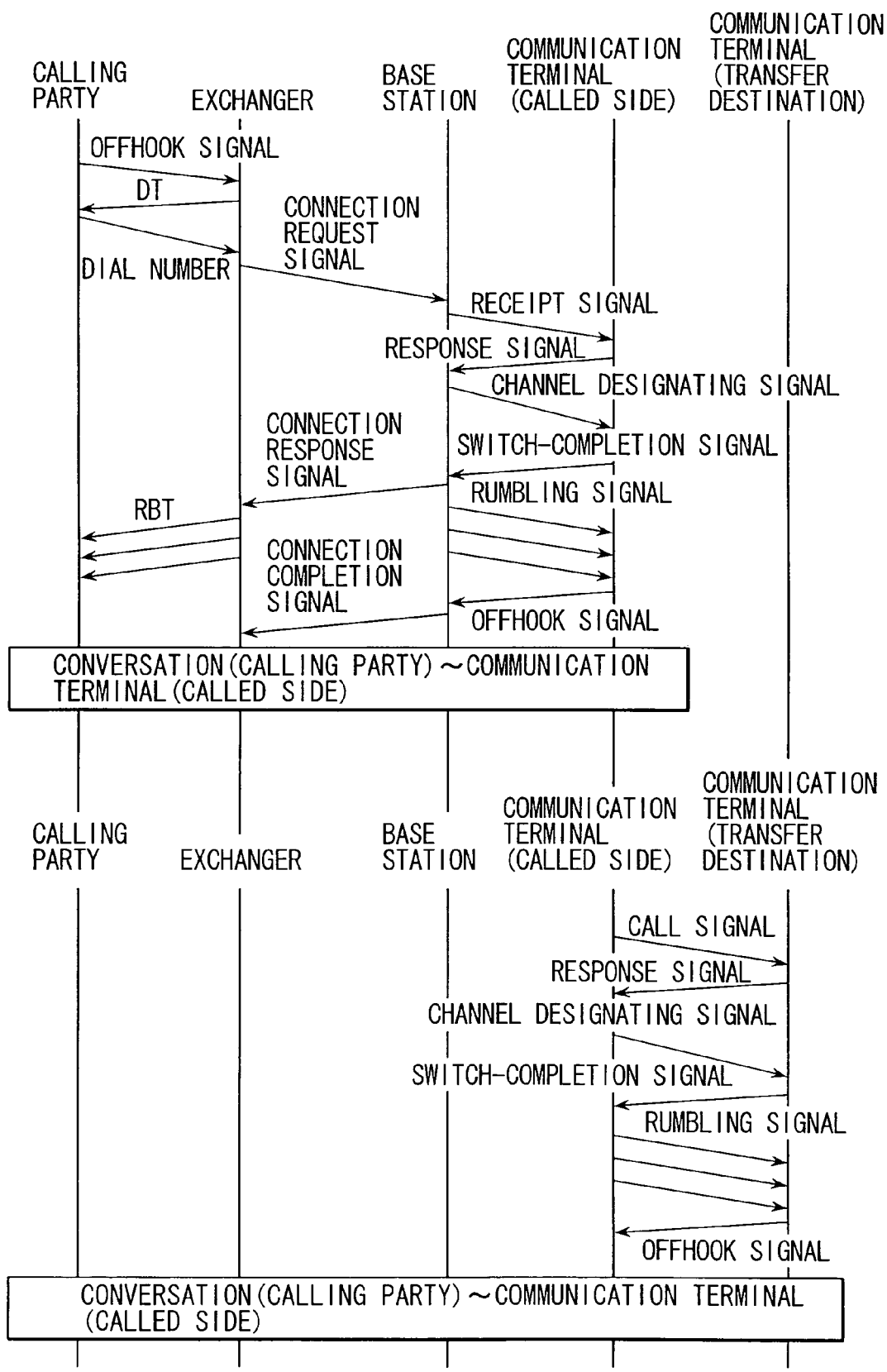
FIG. 4 shows a sequence of a procedure in the plural-channel communication.

FIG. 4 shows the sequence at this time.

Suppose that the communication terminal 1 as the calling party is a device connected to a wired channel (public network 2). At first, an off-hook signal is sent to an exchanger on the public network 2 from the communication terminal 1. The exchanger which has received this signal returns a dial tone signal to the communication terminal 1 as the calling party. The side of the communication terminal 1 confirms that a call can be made by this dial tone signal. Thereafter, the communication terminal 1 transmits a dial signal corresponding to the communication terminal 10. The exchanger sends a connection request signal to the base station 4 in accordance with the dial signal.

The base station 4 sends a call-receipt signal to the communication terminal 10 in accordance with the connection request signal. If a response signal to the call-receipt signal can be received, the base station 4 sends a channel-designating signal to the communication terminal 10 as the called side. The side of the communication terminal 10 switches to a designated channel in accordance with the channel-designating signal, and returns a switch-completion signal to the base station 4. Upon completion of the switching of the channel, a rumbling signal is sent to the communication terminal 10 from the base station 4 thereby to inform the operator of the communication terminal 10 about the receipt of a call.

The switching of the channel is completed, and communication is established through a conversation channel. Then, a connection response signal is returned to the exchanger from the base station 4, and a ring-back signal is sent to the communication terminal 1 as the caller. If an off-hook signal is sent from the communication terminal 10 in this state, a connection-completion signal is sent to the exchanger through the base station 4. In this manner, conversation or the like can be made between the communication terminals 1 and 10.

If the channel connected currently to the first radio unit 20 is transferred to another communication terminal, the following processing is carried out.

That is, at first, the operator of the communication terminal 10 specifies the communication terminal as a transfer destination by the input/output section 60 and pushes down a transmission button or so to makes a transfer instruction (step A13). The communication terminal as the transfer destination is the master device 11 or one of the other communication terminals 12 to 14, which construct a radio network together with the communication terminal 10. At this time, a voice input can be used to specify the transfer destination or make a transfer instruction, in addition to a key input.

The signal thus inputted is supplied to the control section 50. The control section 50 starts the radio unit 30 (step A14) in accordance with the signal, and connects the second radio unit with the communication terminal as the transfer destination, in the same method as described above (step A15).

FIG. 4 shows a sequence of processing at this time.

A call signal is transmitted from the communication terminal 10 to the communication terminal as the transfer destination, and a response signal thereto is returned. The communication terminal 10 then decides a communication channel, and transmits a channel designating signal thereof to the communication terminal as the transfer destination. The side of the communication terminal as the transfer destination switches to the designated channel in accordance with the channel designating signal and returns a switch-completion signal thereof to the communication terminal 10. Upon completion of the switching of the channel, a communication channel to the communication terminal as the transfer destination is established. A rumbling signal is sent to the communication terminal as the transfer destination from the communication terminal 10. If an off-hook signal is sent from the communication terminal as the transfer destination, a connection is made between both terminals.

If a connection between the second radio unit 30 of the communication terminal 10 and the communication terminal as the transfer destination is established, the control section 50 connects the channel, which has been formed between the base station 4 and the first radio unit 20, to the second radio unit 30 (step A16), as shown in the flowchart in FIG. 3. In this manner, a communication channel is formed between the communication terminal 1 as the calling party and the communication terminal as the transfer destination through the second radio unit 30, so conversation or the like can be made between both terminals (step A17).

By thus simultaneously operating the first radio unit 20 and the second radio unit 30, a connection to another communication terminal can be made without disconnecting the radio channel to the base station 4. Accordingly, a connection can be made to another communication terminal than the communication terminal 10 without requiring complicated operation, e.g., without letting the side of the calling party make another call. In this case, the radio channel between the communication terminal 10 and the communication terminal as the transfer destination does not pass through the base station 4, so it is advantageously possible to prevent an extra communication charge.

In the explanation made above, the channel which has been formed between the base station 4 and the first radio unit 20 is automatically connected to the second radio unit 30. However, an instruction for connecting a channel from the communication terminal 10 to the communication terminal as the transfer destination may be made, and a channel to the base station 4 may be connected to the communication terminal as the transfer destination upon confirmation of a response to the instruction.

Figure 5:
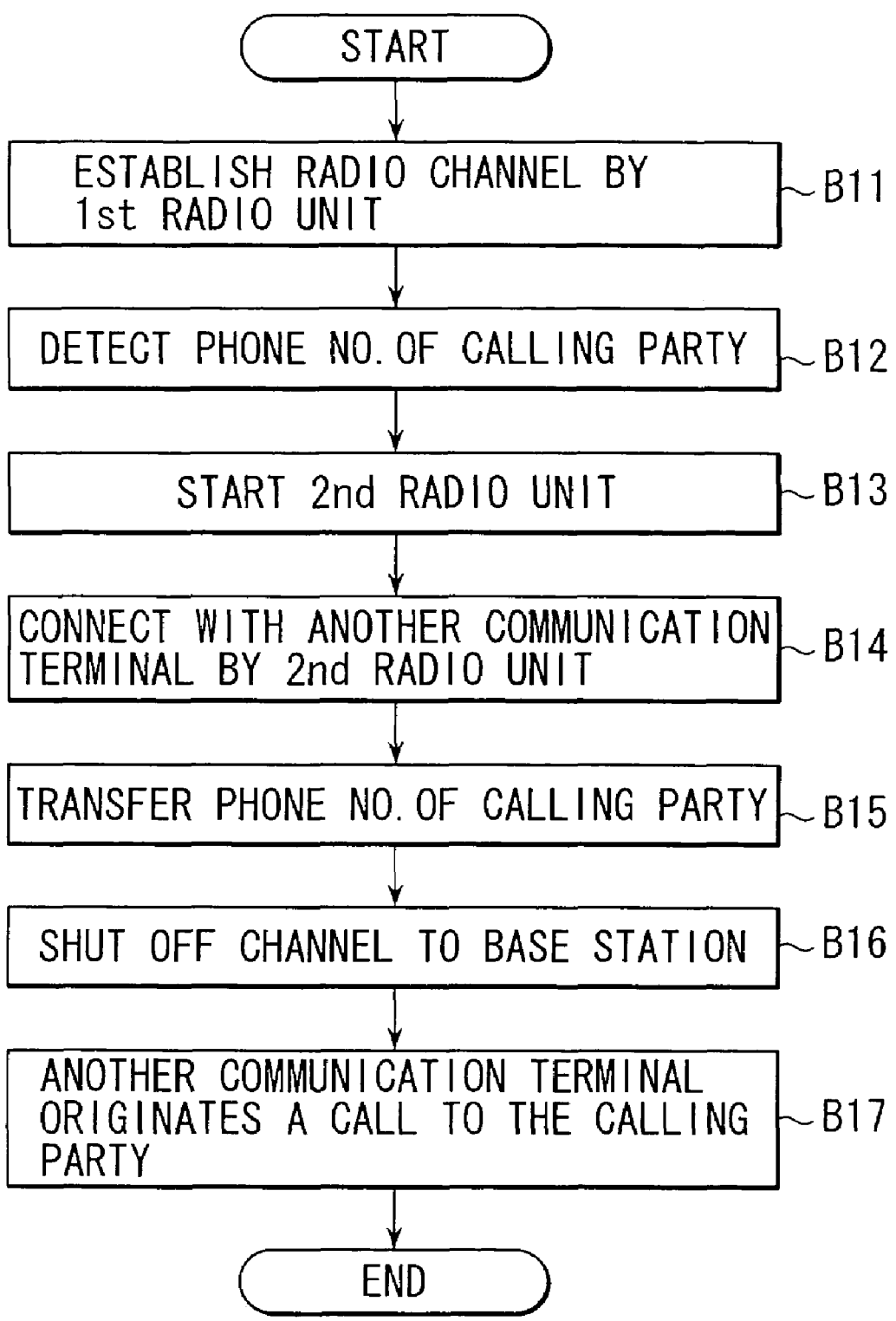
FIG. 5 is a flowchart showing the processing operation in case of making a second call to the calling party from the called side.

In addition, there is another method in which the telephone number of the calling party is transferred to the communication terminal as the transfer destination, and another call is made to the calling party from the communication terminal as the transfer destination, to construct a radio channel. FIG. 5 shows the processing operation in this case.

FIG. 5 is a flowchart showing the case where another call is made to the calling party from the communication terminal as the transfer destination.

The communication terminal 10 constructs a radio channel to the base station 4 by the first radio unit 20 (step B11) and then detects the telephone number of the calling party from the receipt signal at this time (step B12).

Next, the communication terminal 10 starts the second radio unit 30 (step B13) and makes a connection to another communication terminal by the second radio unit 30 (step B14). Upon completion of the connection between the second radio unit 30 and the another communication terminal, the communication terminal 10 transfers the telephone number detected in the step B12 to the another communication terminal (step B15), and then shuts off the channel to the base station 4 (step B16).

If the communication terminal as the transfer destination is the communication terminal 12 and if the communication terminal 12 has a radio function to connect with the base station 4 (the first radio unit 20), like the communication terminal 10, calling operation is thereafter made from the communication terminal 12 as the transfer destination in accordance with the telephone number. Thus, the communication terminal 12 as another communication terminal originates a call to the communication terminal 1 as the calling party through the base station 4 (step B17).

In this method, a communication charge issues to the second call from the communication terminal 12 as the transfer target. However, in the side of the communication terminal 10 as a transfer source (the called side), the first and second radio units 20 and 30 are released, so that communication can advantageously be further made with another communication terminal.

To prevent increase of communication charges, information concerning control of calling, synchronization information, and the like with respect to the base station 4 in the communication terminal 10 should be transferred to the communication terminal 12 as the transfer destination, and the receiver provided in the communication terminal 12 as the transfer destination should be let make dummy operation, to construct synchronization with the base station 4 beforehand. Further, the radio channel between the communication terminal 10 as the transfer source (the called side) and the base station 4 should forcedly be shut off by the side of the communication terminal 10. Simultaneously, the communication terminal 12 as the transfer destination should take over the channel through which communication has been made between the transfer source (the called side) and the base station 4. In this manner, a channel between the communication terminal 12 as the transfer destination and the base station 4 (the calling party) can be formed without making another call.

Figure 6:
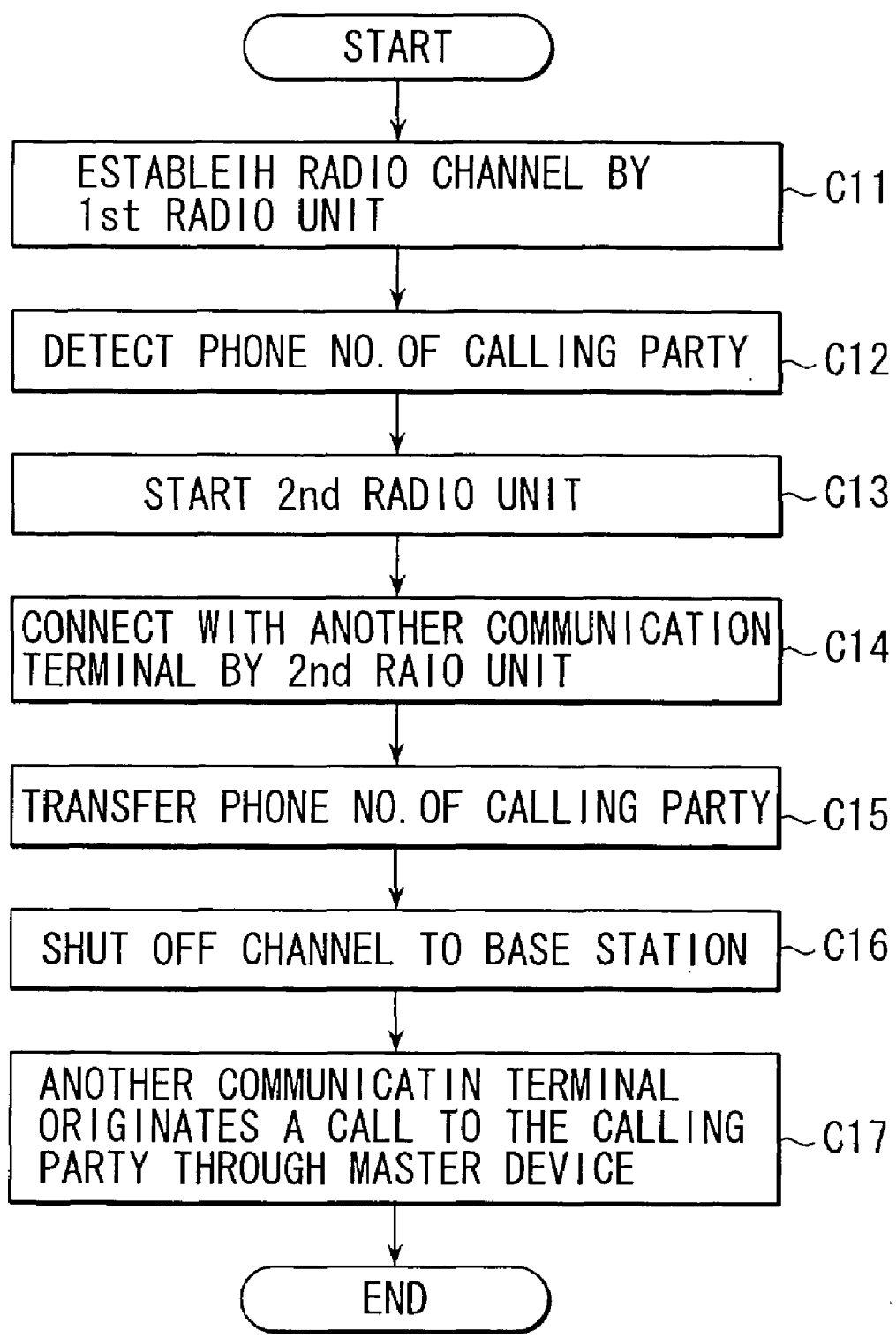
FIG. 6 is a flowchart showing the processing operation in case of making a second call to the calling party through a master device from the called side.

Also, if another call is made through the master device 11 connected to a wired channel in place of making another call from the communication terminal 12 as the transfer destination, communication charges can be lowered rather than by using a radio channel. FIG. 6 shows the processing operation in this case.

FIG. 6 is a flowchart showing the processing operation in case of making another call to the calling party through the master device from the communication terminal as the transfer destination.

Upon construction of a radio channel to the base station 4 by the first radio unit 20 (step C11), the communication terminal 10 detects the telephone number of the calling party from the receipt signal at this time (step C12).

Next, the communication terminal 10 starts the second radio unit 30 (step C13) and makes connection with another communication terminal by this second radio unit 30 (step C14). Upon completion of connection between the second radio unit 30 and the another communication terminal, the communication terminal 10 transfers the telephone number detected in the step C12 to the another communication terminal (step C15) and shuts off the channel to the base station 4 (step C16).

If the communication terminal as the transfer destination is the communication terminal 12 shown in FIG. 1, connection is made from this communication terminal 12 to the master device 11 connected to a wired channel, with use of the second radio unit. Using the telephone number, another communication terminal (the communication terminal 12) originates a call to the communication terminal 1 as a calling party through the master device 11 (step C17).

Figure 7:
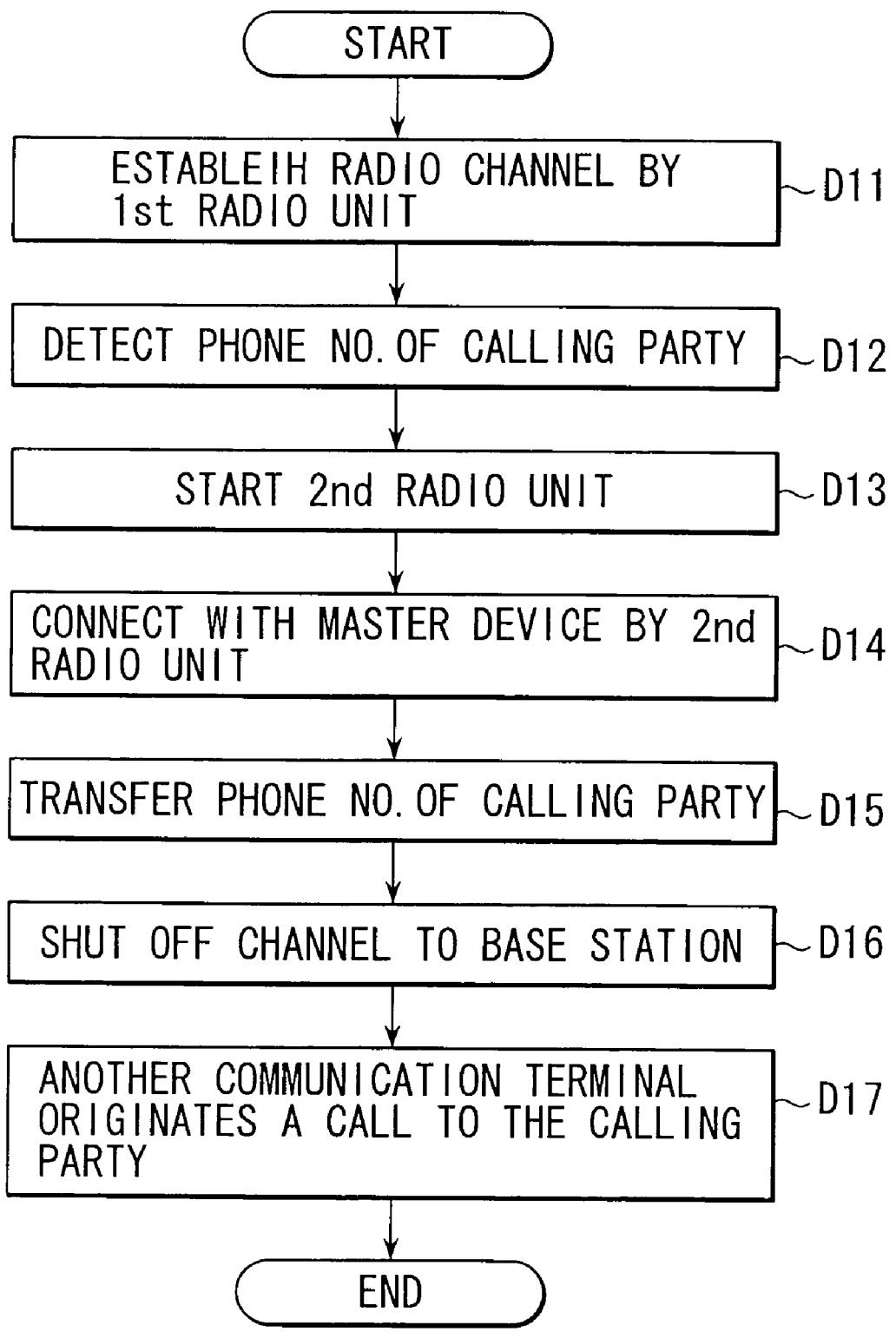
FIG. 7 is a flowchart showing the processing operation in case of making a second call to the calling party with the master device set as the transfer destination.
Figure 8:
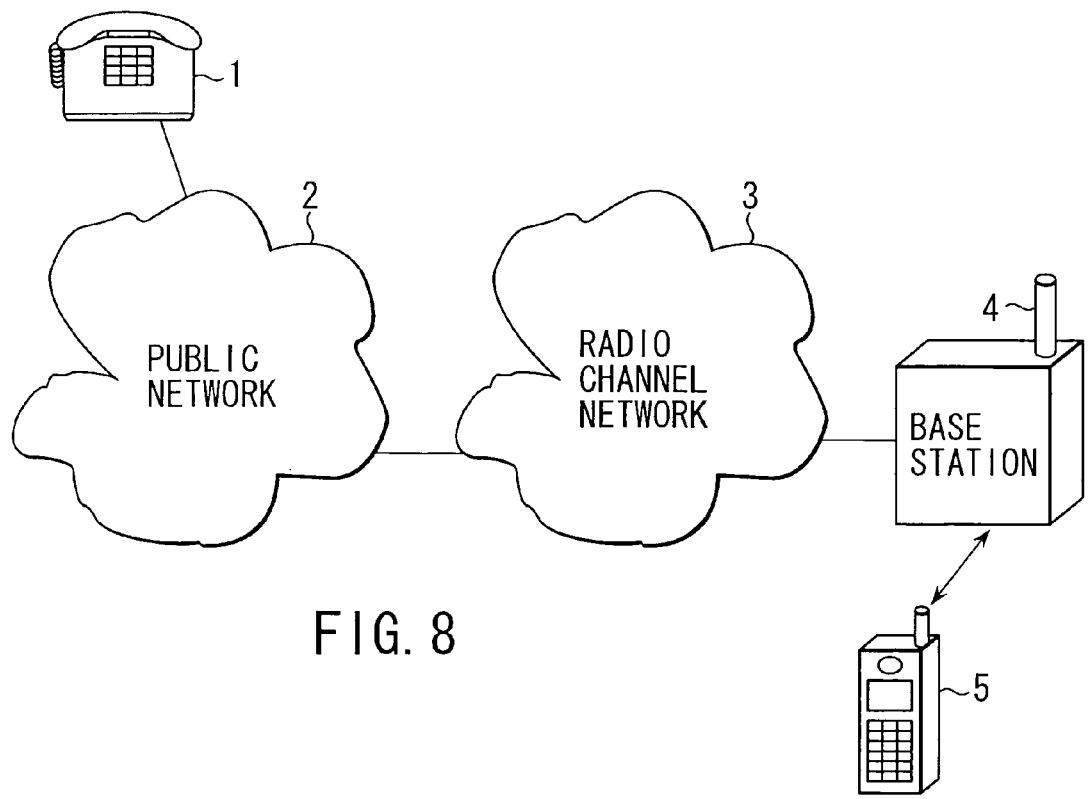
FIG. 8 is a view showing a conventional channel connection form.
Figure 9:
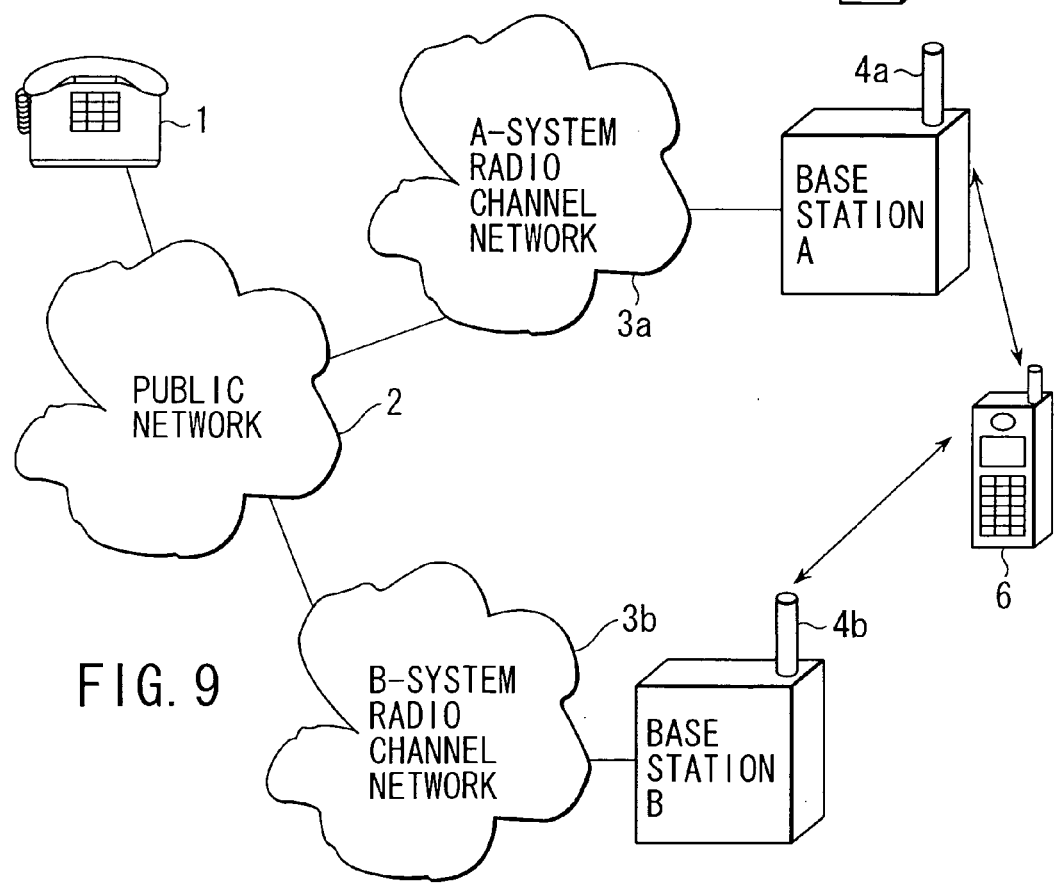
FIG. 9 is a view showing a channel connection form in a conventional dual-mode.

In another method, when the telephone number of the calling party is detected from the receipt signal from the base station 4, the telephone number can be called to the calling party through the muster device 11 connected to the wired channel, thereby to form a channel. FIG. 7 shows the processing operation at this time.

FIG. 7 is a flowchart showing the processing operation in case of making another call to the calling party with the master device set as the transfer destination.

The communication terminal 10 constructs a radio channel to the base station 4 by the first radio unit 20 (step D11) and detects the telephone number of the calling party from the receipt signal at this time (step D12).

Next, the communication terminal 10 starts the second radio unit 30 (step D13) and makes connection with the master device 11 by this second radio unit 30 (step D14). Upon completion of connection between the second radio unit 30 and the master device 11, the communication terminal 10 transfers the telephone number detected in the step D12 to the master device 11 (step D15) and shuts off the channel to the base station 4 (step D16).

In this case, the master device 11 is a device connected to a wired channel, and using the telephone number, another communication terminal (the master device 11 originates a call to the communication terminal 1 as a calling party through the public network 2 (step D17).

Thus, the first and second radio units 20 and 30 are provided in the one casing of the communication terminal 10 so that plural channels can be connected simultaneously. Therefore, information concerning radio channels connected to the base station 4 can be transferred to another communication terminal. Accordingly, communication can be made with another communication terminal (the master device 11 or any one of the communication terminals 12 to 14) without making another call from the side of the communication terminal 1 as a calling party.

Also, since plural channels can be connected simultaneously, simultaneous conversation can be made among a group including another communication terminal existing in the radio area of the communication terminal 10, in addition to the communication terminal 1 as the calling party and the communication terminal 10 as the called side.

If the second radio unit 30 is established by a radio unit which uses a weak radio wave, the transmission power is remarkably small compared with the transmission power of the first radio unit 20, so that the power consumption during operation is sufficiently low compared with the radio unit 1. Therefore, increase of the current consumed during operation and increase of the heat loss are negligible compared with those of the radio unit 1. Accordingly, the casing is never enlarged due to the heat loss and the current consumption even if the first radio unit 20 and the second radio unit 30 are established to operate simultaneously.

In addition, the communication terminal as the transfer destination is not limited to one terminal but plural communication terminals may be transfer destinations. That is, radio communication can be made with other terminals in one-to-many communication form.

The channel used in the present specification means a communication channel through which data can be transmitted/received. However, data flowing through the channel is not limited.

Also, data from the base station may be processed by the first radio unit and transmitted to the second radio unit or may be subjected to code-conversion and then may be transmitted.

As has been described above, the present invention comprises two radio units, i.e., a first radio which connects with a base station and a second radio unit which connects with another communication terminal or a master device connected to a wired channel. Therefore, a channel connected to the base station by the first radio unit can be connected to another radio unit or the master device through the second radio unit. Accordingly, communication can be made with a terminal as a transfer destination, without making another call from the calling party to the terminal as a transfer destination, so an extra communication charge can be prevented from issuing due to another call.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal comprising:
   a first radio unit configured to make radio communication with a base station over a first radio channel in accordance with a first radio communication system, the base station via which the mobile communication terminal is connectable with a first communication terminal;
   a second radio unit configured to make radio communication with a second communication terminal over a second radio channel in accordance with a second radio communication system; and
   means for connecting the first radio channel and the second radio channel, such that a communication channel between the first communication terminal and the second communication terminal can be established,
   wherein the first radio unit and the second radio unit are configured to selectively make simultaneous communication with the base station and the second communication terminal, respectively.

2. The mobile communication terminal according to claim 1, wherein the first communication terminal is connected with a public network over a wired channel.

3. The mobile communication terminal according to claim 1, further comprising means for obtaining a telephone number of the first communication terminal via the base station when the first communication terminal is connected with the base station, wherein
   the connecting means transfers the obtained telephone number to the second communication terminal over the second radio channel.

4. The mobile communication terminal according to claim 1, wherein a transmission power of the second radio unit is set to be sufficiently small compared with that of the first radio unit.

5. The mobile communication terminal according to claim 4, wherein the transmission power of the second radio unit is $\frac{1}{10}$ or less of the transmission power of the first radio unit.

6. A channel connection method for a mobile communication terminal connectable with a first communication terminal via a base station, the method comprising:
   making radio communication with a base station over a first radio channel in accordance with a first radio communication system;
   simultaneously making radio communication with a second communication terminal over a second radio channel in accordance with a second radio communication system; and
   establishing a communication channel between the first communication terminal and the second communication terminal by connecting the first radio channel and the second radio channel.

7. The channel connection method according to claim 6, wherein the second communication terminal is connected with a public network over a wired channel.

8. The channel connection method according to claim 6, further comprising:
   obtaining a telephone number of the first communication terminal via the base station when the first communication terminal is connected with the base station; and
   transferring the obtained telephone number to the second communication terminal over the second radio channel.

9. The channel connection method according to claim 8, further comprising
   making a call to the first communication terminal from the second communication terminal in accordance with the transferred telephone number.

10. A mobile communication terminal comprising:
    a first radio unit configured to make radio communication with a base station over a first radio channel in accordance with a first radio communication system, the base station via which the mobile communication terminal being connectable with a first communication terminal;

a second radio unit configured to make radio communication with a second communication terminal over a second radio channel in accordance with a second radio communication system;

means for receiving information of a predetermined type from the base station over the first radio channel; and means for sending the received information to the second communication terminal over the second radio channel while receiving the information, wherein the first radio unit and the second radio unit are configured to selectively make simultaneous communication with the base station and the second communication terminal, respectively.

11. The mobile communication terminal according to claim 10, wherein the second communication terminal is connected with a public network over a wired channel.

12. The mobile communication terminal according to claim 10, further comprising means for obtaining a telephone number of a calling party via the base station when the radio channel is connected to the base station, wherein the sending means transfers the obtained telephone number to the second communication terminal over the second radio channel.

13. The mobile communication terminal according to claim 10, wherein a transmission power of the second radio unit is set to be sufficiently small compared with that of the first radio unit.

14. The mobile communication terminal according to claim 10, wherein the transmission power of the second radio unit is $\frac{1}{10}$ or less of the transmission power of the first radio unit.

* * * * *